Figure 1:
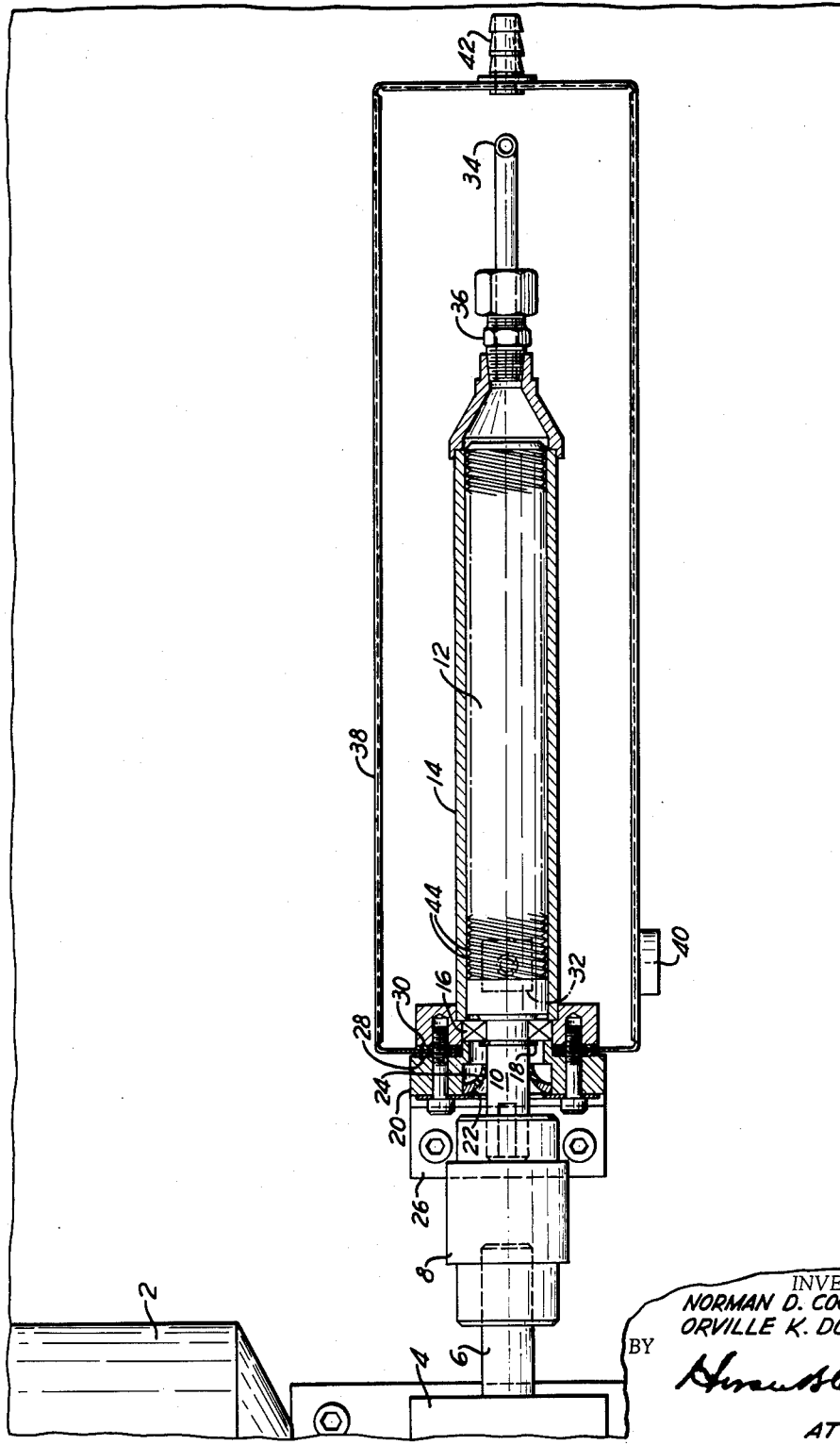

Aug. 31, 1965    N. D. COGGESHALL ETAL    3,203,250
SAMPLING APPARATUS
Filed Nov. 29, 1962                           2 Sheets-Sheet 1

INVENTORS.
NORMAN D. COGGESHALL
ORVILLE K. DOOLEN
BY
ATTORNEY

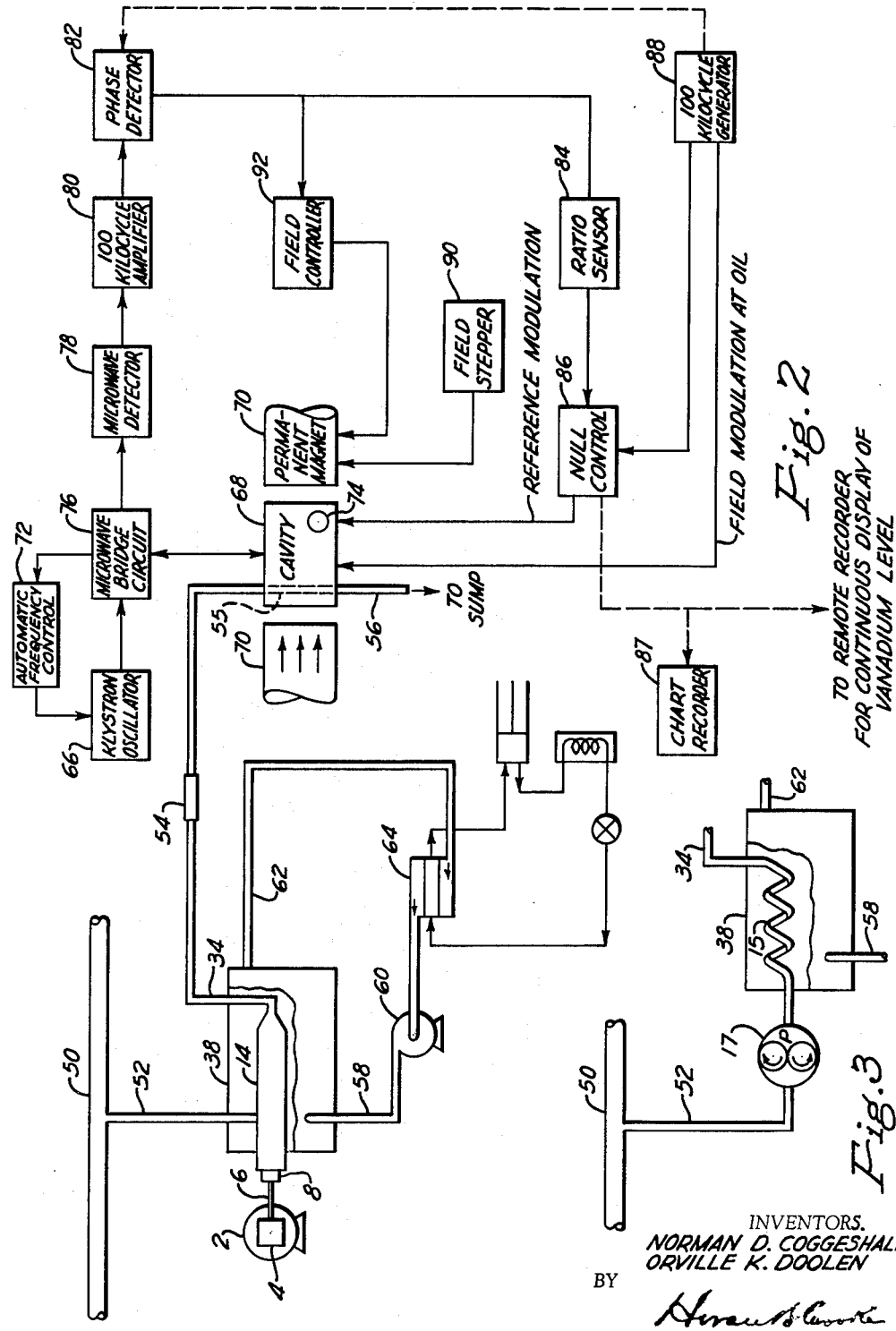

3,203,250
SAMPLING APPARATUS
Norman D. Coggeshall, Verona, and Orville K. Doolen, Oakmont, Pa., assignors to Gulf Research & Development Company, Pittsburgh, Pa., a corporation of Delaware
Filed Nov. 29, 1962, Ser. No. 240,882
4 Claims. (Cl. 73—422)

This invention relates to apparatus for sampling a body of liquid and for analyzing the samples taken therefrom, and more particularly, to apparatus for on-line sampling of a flowing liquid stream where said analysis is carried out at temperatures, pressures and flow rates that are different from those of the flowing liquid stream.

Automatic, on-line analysis of liquid process streams frequently presents problems that are not encountered when the analysis is carried out by routine laboratory procedures. For example, the temperature, pressure and flow rate of the process stream being subjected to analysis are functions of the process conditions, and these conditions may not be those best suited for the particular method of analysis required. This difficulty may be compounded when the viscosity of the liquid subjected to analysis is significantly different at the desired analytical conditions from its viscosity in the process stream.

By way of illustration, in the on-line analysis of a hydrocarbon oil refinery process stream, such as a vacuum distillation tower gas oil side stream, for vanadium content using an electron paramagnetic resonance spectrometric technique, it has been found that the process stream temperature pressure and flow rate are not well-suited for measurement of the particular physical property on which the analytical method depends. Thus, a typical temperature for a vacuum distillation tower gas oil side stream might be about 400° F., and a typical stream pressure might be about 125 p.s.i.g. At this temperature and pressure, the viscosity of the oil would be so low that accurate monitoring could not be obtained.

The problem of flow rate through the sample chamber of the analytical instrument is complicated by the fact that the flow rate of the process stream, on which the flow rate through the sample chamber ordinarily depends, is not constant but varies with changes in the process conditions and with changes in the properties of the oil being processed. Accurate monitoring cannot be achieved when the flow through the instrument pulsates.

Moreover, the sample chamber of the analytical instrument may not be able to withstand pressures of the magnitude encountered in a process stream. For example, the fused quartz sample chambers employed in EPR spectrometry are not adapted to withstand high pressures.

Finally, the physical property measured in accordance with the particular analytical method employed may be affected by high temperatures, as is the case with the paramagnetic resonance of vanadium in hydrocarbon oils. Thus, the vanadium resonance signal intensity for a particular oil was found to be about 0.9 as great at 100° F. as at 70° F., about 0.76 as great at 110° F. as at 70° F., and about 0.62 as great at 120° F. as at 70° F.

The foregoing difficulties are not satisfactorily solved merely by cooling the sample stream, as the increase in viscosity experienced by the oil upon cooling may be so great as to interfere with the liquid flow. When the change in viscosity is so great as to approach or achieve a change of flow, difficulties may also be encountered in obtaining a uniform temperature throughout the oil stream. Moreover, it will be recognized that the flow rate of the liquid sample stream, even in a relatively viscous state, may still be subject to change with changes in the processing conditions and/or changes in the nature of the oil being processed.

The present invention relates to apparatus for sampling a body of liquid, e.g., a refinery process stream, and for analyzing the samples taken therefrom at temperature, pressure and flow conditions other than those existing in the body of liquid from which the samples are taken, whereby improved analytical accuracy, and continuous, automatic monitoring are made possible. In accordance with the present invention, there is provided, inter alia, the combination of analysis means for detecting and measuring a physical property of the liquid to be analyzed and a sampling conduit connecting the analysis means and the main body of liquid to be analyzed for delivering representative portions of the liquid in said main body to the analysis means. An electron paramagnetic resonance spectrometer capable of detecting and measuring the intensity of a resonance signal for paramagnetic vanadium in petroleum hydrocarbon oils is an example of a particular analysis means contemplated in the present invention, but other analytical instruments utilizing analytical methods dependent upon detection and measurement of physical properties that are affected by temperature, pressure and/or flow rate also can be used. Heat exchange means are also provided intermediate of the main body of liquid and the analysis means for adjusting the temperature of the liquid in the sampling conduit to the temperature desired in the analysis means, irrespective of the normal range of temperatures of the main body of liquid. The apparatus of this invention also includes means intermediate of the main body of liquid and the analysis means for adjusting the flow conditions, that is, the fluid pressure and flow rate, of the liquid in the sampling conduit to the conditions desired in the analysis means, irrespective of the normal range of temperatures and flow conditions in the main body of liquid. In a preferred embodiment, the means for adjusting the temperature and flow conditions of the liquid in the sample conduit may comprise a screw conveyor assembly comprising an elongated cylindrical pump tube containing a coaxially positioned pump screw. The pump screw is provided with alternate helical flights or lands and grooves, the latter forming a path of flow for liquid introduced into the pump tube. The outer peripheries of the flights of the pump screw are in close proximity to the inner surfaces of the pump tube. Drive means are also provided for rotating the pump screw and forcing the sample liquid from one end of the pump tube to the other. The preferred means for adjusting the temperature and flow conditions of the sample liquid also involves heat exchange means comprising a jacket spaced apart from and surrounding the pump tube of the screw conveyor assembly. This jacket is provided with inlet and outlet means, which are in turn provided with conduit means fluidly connecting said jacket with the heat exchange chamber of a refrigerating means. Pump means serve to circulate a heat exchange fluid from the heat exchange chamber to the jacket and back to the heat exchange chamber. The use of a flexible coupling between the outlet of the screw conveyor assembly and the analysis means is especially advantageous, and such use is included in the present invention.

Referring briefly to the drawings, FIGURE 1 is a plan view, partly in horizontal section, of a preferred means for adjusting the temperature and flow conditions of the sample liquid. FIGURE 2 is a flow diagram showing a preferred combination of the sampling means, analysis means and means for adjusting the temperature and flow conditions of the sample liquid included by the present invention. FIGURE 3 is an alternative embodiment of sampling means and means for adjusting the temperature and flow conditions of the sample liquid included by the present invention. In the several figures of the drawing, like numerals refer to the same or similar elements.

The present invention can be best understood by detailed reference to the drawings. Referring first to FIGURE 1, a power train composed of electric motor 2, change speed mechanism 4 and drive shaft 6 is connected through flexible coupling 8 to shaft 10 of the pump screw element 12 of a screw conveyor assembly. The screw conveyor assembly is mounted on the same supporting surface as the motor 2 and change speed mechanism 4 by means of angle mount 26. The base of angle mount 26 is bolted to the supporting surface. The vertical portion of angle mount 26 is bolted first to support plate 20 and then to an anchoring member positioned against the inside wall of jacket 38. Support plate 20 is provided with a stepped annular opening, through which passes shaft 10 of pump screw 12. The larger annular space in support plate 20 contains a shaft seal member 22 which has embedded therein a synthetic rubber seal 24. Seal 24 bears upon shaft 10 and prevents leakage of the liquid passed through the screw conveyor along shaft 10. Numeral 16 denotes an annular ball-bearing and race forming a bearing member for shaft 10. Bearing race 16 is maintained in proper position by retaining ring 18 which is seated in an annular recess in shaft 10. Pump screw 12 mounted coaxially within pump tube 14, together with the latter element, forms a screw conveyor assembly for causing liquid introduced into the pump tube to advance therethrough. The outer peripheries of the flights or lands 44 of pump screw 12 are in close proximity to the inside surface of pump tube 14 so as to facilitate removal of any solid material formed on the inside surface of pump tube assembly 14 with each revolution of pump screw 12. Numeral 32 designates an inlet saddle mounted on the upper surface of pump tube assembly 14. An annular orifice positioned in the center of inlet saddle 32 forms inlet means permitting passage of the liquid sample whose temperature and flow conditions are to be adjusted from the sample conduit, to which the orifice is connected, into the helical, grooved recesses between the flights 44 of pump screw 12. These grooved recesses form a path of flow through the pump tube for liquid introduced therein. Numeral 34 designates the outlet of the screw conveyor mechanism through which the liquid sample passes following the desired adjustment of its temperature and flow conditions in said screw conveyor. Outlet line 34 is connected to the screw conveyor proper through a suitable coupling 36. The pump tube assembly 14 is surrounded by a jacket 38 which is spaced apart therefrom. Gaskets 28 and 30 form a liquid tight seal between the interior and exterior of jacket 38 in the vicinity of the mounting bolts. Numeral 40 designates a pipe fitting forming an inlet for a heat exchange fluid. While cooling water is specifically disclosed as the heat exchange fluid in the embodiment described hereinafter, it will be appreciated that a heated fluid can be used where the analysis temperature is greater than the temperature of the liquid body from which samples are taken for analysis. Numeral 42 designates a nipple providing an outlet for the heat exchange liquid from jacket 38. A top, not shown, for jacket 38, having slots through which pass the inlet conduit for pump tube 14, and the outlet conduit 34, is also provided.

Referring now to FIGURE 2, which as stated, illustrates a preferred combination of sampling means, temperature and flow condition adjustment means, and analysis means, numerals up to and including numeral 64 refer to the sampling, and temperature and flow condition adjustment portions of the apparatus combination. With particular reference to these portions of the drawing, numeral 50 designates a main conduit, through which is caused to flow a stream of liquid to be analyzed. Numerals 52 and 34 refer to separate portions of a sample conduit adapted to deliver a representative portion of the liquid stream flowing through main conduit 50 to the sample chamber 55 of the analysis means shown schematically on the right-hand side of the figure. Inlet conduit 58 and pump 60 form means for circulating a refrigerated heat exchange liquid to the jacket 38 from the heat exchange chamber 64 of a conventional, vapor-compression refrigerating unit, shown schematically. Numeral 62 denotes an outlet conduit for returning heat exchange liquid from jacket 38 to the inlet side of heat exchange chamber 64.

In the alternative embodiment of the sampling, and temperature and flow condition adjustment means shown in FIGURE 3, numeral 15 designates a tubular cooling coil connected in series between portions 52 and 34 of the sample conduit. Numeral 17 designates a gear pump for adjusting the flow conditions of the liquid in the sample line irrespective of those existing in main conduit 50.

In operation, with particular reference to FIGURE 2, a representative portion of a liquid stream to be analyzed, for example, a vacuum tower gas oil side stream, flowing through a main conduit 50 at a temperature of about 400° F. and under a fluid pressure of about 125 p.s.i.g. is diverted through sample conduit 52 into the grooved recesses of a pump screw 12 positioned within pump tube 14 and having a thread length of about 21 feet. The liquid in these grooved recesses is caused to move toward the outlet 34 of pump tube 14 by the rotational motion imparted to pump screw 12 by means of motor 2, change speed mechanism 4 and drive shaft 6. As the liquid progresses along a helical path along the inside surface of pump tube 14, the liquid loses heat to a refrigerated heat exchange liquid, such as a water-ethylene glycol mixture, circulated through jacket 38. As the temperature of the oil within the pump tube assembly falls below the pour point of the oil, about 120° F. in the present instance, the oil assumes a semisolid or soft grease-like consistency along the surface of the pump tube. This semisolid film forms an insulating layer that retards the removal of heat from the remaining liquid oil. However, the scraping action of the flights of pump screw 12 against the inside surface of pump tube 14 with each revolution of pump screw 12 causes the film of semisolid material to be scraped from the tube surfaces and mixed with any unsolidified liquid whereby uniform temperature and homogeneous consistency is achieved. Thus, a homogeneous semisolid stream of uniform temperature, in this instance, about 70° F., is continuously extruded through outlet 34 of pump tube 14, in this instance, at a constant, pulsationless rate of about 12 ml. per minute. The temperature of the stream is adjusted below the maximum temperature (80° F.) desired in the analysis means, as some reheating of the oil takes place in the sample chamber 55 of the analytical instrument.

The semisolid condition of the oil, together with the resistance to flow of the screw conveyor assembly, provides an effective seal against liquid flow. Consequently, where it is desired to stop flow through the analytical instrument for any reason, for example, mechanical adjustment of the instrument, all that is necessary to take the instrument out of service is to switch off motor 2. When the liquid being analyzed is not sufficiently viscous to stop liquid flow, a conventional flow regulating device can be employed in the sample line downstream of the screw conveyor assembly.

The extruded material is forced through flexible coupling 54 and through the sample chamber 55 of the analytical device, where the desired physical property, e.g., vanadium electron paramagnetic resonance, is detected and measured, and from this point through line 56 to a sump. Alternatively, the oil from line 56 can be returned to main conduit 50 through conduit means not shown. Refrigerated heat exchange liquid is circulated through jacket 38 from the heat exchange chamber of a conventional vapor-compression refrigerating system by means of pump 60, inlet 58 and outlet line 62.

With further reference to FIGURE 2, numerals 66 and following indicate generally the component elements of a model X–4800 EPR Vanadium Process Monitor, manufactured by Varian Associates. While the particular analytical instrument illustrated is preferred for continuous monitoring of vanadium in hydrocarbon oils for the reason that it is especially designed for this purpose, the use of this instrument is not essential to the present invention, and other analytical instruments can be used. For example, a conventional, Varian X-band model V–4500 electron paramagnetic resonance spectrometer can be employed in the apparatus of the present invention, not only to detect and measure resonance due to the paramagnetic vanadium in hydrocarbon oils but also to detect resonance due to other paramagnetic substances in the same or other liquid media. In fact, analytical instruments based on the detection and measurement of properties entirely different from electron paramagnetic resonance can be used. For example, a spectrophotometer can be employed as the analysis means of the herein disclosed combination apparatus, where the property to be measured in the sample liquid is dependent upon light transmission rather than paramagnetic resonance.

Inasmuch as the invention in its broader aspects does not depend for novelty upon the use of any particular analytical instrument, it will be seen that the structural or functional details of the model X–4800 EPR Process Monitor shown in FIGURE 2 form no part of the present invention. However, in order that the invention may be fully understood it may be stated generally that the principles of EPR analysis are generally described in Bloch et al. Reissue Patent No. 23,950, and the principles of such analysis as applied to the determination of vanadium paramagnetic resonance in petroleum oils are described in application Serial No. 36,381, filed June 15, 1960, in the name of A. J. Saraceno, now Patent No. 3,087,888. More particularly, the model X–4800 EPR Process Monitor illustrated in FIGURE 2 is a null-seeking system in which the resonance signal from paramagnetic vanadium in a sample to be analyzed is compared with a resonance signal from a reference sample. Referring in detail to the diagram in FIGURE 2, a klystron oscillator 66 connected to a source of electrical power, not shown, delivers microwave power to a cavity 68, located between the poles 70 of a permanent magnet. The klystron frequency is locked to the cavity frequency by an automatic frequency control circuit 72. In operation, any difference in amplitude between the signal strength at zero resonance, and the resultant signal amplitude at the vanadium resonance peak, between the signal from the oil sample in sample chamber 55 and an opposite phase signal from reference sample 74, manifests itself as an output from the microwave bridge circuit 76. This output is detected by microwave detector 78, amplified by 100 kc. amplifier 80, and passed to phase detector 82. The output of the phase detector 82 is fed to a ratio sensor 84. This element in turn transmits an electrical output proportional to the aforesaid difference in signal amplitude to a servo motor component of a motor-driven potentiometer component of null control 86. The motor effects an adjustment of the potentiometer output, so that this output—in amplified form—can be used to modulate the reference sample signal and eliminate the aforesaid difference in signal amplitude. The degree of adjustment of the potentiometer is calibrated against the degree of adjustment required for an oil of comparable viscosity and having a known vanadium content, in terms of the vanadium content of the oil. A D.C. voltage is applied to the potentiometer to drive the recorder 87 and also any remote recorder, controller, or recorder-controllers that may be employed. Power for 100 kc. sweep modulation of both reference sample 74 and the oil sample in sample chamber 55 is supplied by the 100 kilocycle generator 88. A phase shifter, not shown, is provided in the reference modulation circuit so that this sweep is 180 degrees out of phase with the sweep of the oil sample, whereby opposite phase signals are obtained from the oil sample and the reference sample.

The magnetic field strength is varied from the point of zero resonance to the point of the vanadium resonance peak by field stepper 90 in response to a programmer, not shown. Periodically, another programmer switches on the circuits of field controller 92 to correct any drift in the magnetic field.

The functioning of the embodiment shown in FIGURE 3 is similar to that of the embodiment of FIGURE 2. The embodiment of FIGURE 3, however, is less satisfactory when used in connection with a liquid that is to be cooled below its pour point, for the reasons indicated.

It will be understood that the herein described specific embodiments are intended as illustrative only and not as limiting the scope of the invention. Good results can also be obtained by the substitution of equivalent elements included within the scope of the present invention for the corresponding elements of the foregoing specific embodiments.

For the reasons stated, the scope of the present invention is not to be limited by the foregoing description but only by the scope of the appended claims.

We claim:

1. Apparatus for sampling a liquid stream flowing in a main conduit and for analyzing the samples so obtained at temperature, fluid pressure and flow conditions other than those existing in said main conduit, comprising analysis means for continuously detecting and measuring a physical property of the liquid to be analyzed, a sampling conduit connecting the analysis means and said main conduit for delivering representative portions of the liquid stream flowing through said main conduit to said analysis means, heat exchange means intermediate of said main conduit and the analysis means for adjusting the temperature of the liquid in the sampling conduit to the temperature desired in the analysis means, irrespective of the temperature of said liquid stream, means intermediate of said main conduit and said analysis means for adjusting the fluid pressure and the flow rate of the liquid in the sampling conduit to the conditions desired in the analysis means, irrespective of the fluid pressure and flow rate of said liquid stream, said means for adjusting the fluid pressure and flow rate comprising a cylindrical pump tube, a pump screw positioned coaxially within said cylindrical pump tube and having alternate, helical flights and grooves, the latter forming a path of flow through said pump tube, the outer peripheries of the flights of said pump screw being in close proximity to the inside surface of said pump tube, and drive means for causing rotation of said pump screw within said pump tube, whereby liquid introduced into said pump tube is caused to advance therethrough.

2. Apparatus for sampling a liquid stream flowing in a main conduit and for analyzing the samples so obtained at temperature, fluid pressure and flow conditions other than those existing in said conduit, comprising analysis means for detecting and measuring a physical property of the liquid to be analyzed, a sampling conduit connecting the analysis means and said main conduit for delivering representative portions of the liquid stream flowing through said main conduit to said analysis means, flow regulating means intermediate of said main conduit and said analysis means for adjusting the fluid pressure and flow rate of the liquid in the sampling conduit to the conditions desired in the analysis means, said flow regulating means comprising a cylindrical pump tube, a pump screw positioned coaxially within said cylindrical pump tube and having alternate, helical, flights and grooves, the latter forming a path of flow through said pump tube, the outer peripheries of the flights of said pump screw being in close proximity to the inside surface of said pump tube, and drive means for causing rotation of said pump screw within said pump tube, whereby liquid introduced into said pump tube is caused to advance therethrough, cooling means comprising a jacket surrounding said pump tube and spaced apart therefrom, said jacket having an inlet and an outlet, said inlet and outlet being provided with conduit means fluidly connecting said jacket with the heat exchange chamber of a refrigerating means, means for circulating heat exchange fluid from said heat exchange chamber to said jacket and back to said heat exchange chamber.

3. Apparatus for sampling a liquid stream flowing in a main conduit and for analyzing the samples so obtained at temperature, fluid pressure and flow conditions other than those existing in said main conduit, comprising electron paramagnetic resonance spectrometric analysis means for continuously detecting and measuring the intensity of a resonance signal for a paramagnetic substance in the liquid to be analyzed, a sampling conduit connecting the analysis means and said main conduit for delivering representative portions of the liquid stream flowing through said main conduit to said analysis means, heat exchange means intermediate of said main conduit and the analysis means for adjusting the temperature of the liquid in the sampling conduit to the temperature desired in the analysis means, irrespective of the temperature of said liquid stream, means intermediate of said main conduit and said analysis means for adjusting the fluid pressure and the flow rate of the liquid in the sampling conduit to the conditions desired in the analysis means, irrespective of the fluid pressure and flow rate of the liquid stream in said main conduit, said means for adjusting the fluid pressure and flow rate comprising a cylindrical pump tube, a pump screw positioned coaxially within said cylindrical pump tube and having alternate, helical flights and grooves, the latter forming a path of flow through said pump tube, the outer peripheries of the flights of said pump screw being in close proximity to the inside surface of said pump tube, and drive means for causing rotation of said pump screw within said pump tube, whereby liquid introduced into said pump tube is caused to advance therethrough.

4. Apparatus for sampling a liquid stream flowing in a main conduit and analyzing the samples so obtained at temperature, fluid pressure and flow conditions other than those existing in said conduit, comprising electron paramagnetic resonance spectrometric analysis means for detecting and measuring a resonance signal for a paramagnetic substance in the liquid to be analyzed, a sampling conduit connecting the analysis means and said main conduit for delivering representative portions of the liquid stream flowing through said main conduit to said analysis means, flow regulating means intermediate of said main conduit and said analysis means for adjusting the fluid pressure and flow rate of the liquid in the sampling conduit to the conditions desired in the analysis means, irrespective of the fluid pressure and flow rate of the liquid stream in said main conduit, said flow regulating means comprising a cylindrical pump tube, a pump screw positioned coaxially within said cylindrical pump tube, said pump screw having alternate, helical flights and grooves, said grooves forming a path through said pump tube for liquid introduced therein, the outer peripheries of the flights of said pump screw being in close proximity to the inside surface of said pump tube, and drive means for causing rotation of said pump screw within said pump tube, whereby liquid introduced into said pump tube is caused to advance therethrough, cooling means comprising a jacket surrounding said pump tube and spaced apart therefrom, said jacket having an inlet and an outlet, said inlet and outlet being provided with conduit means fluidly connecting said jacket with the heat exchange chamber of a refrigerating means, means for circulating heat exchange fluid from said heat exchange chamber to said jacket and back to said heat exchange chamber.

References Cited by the Examiner
UNITED STATES PATENTS

| | | | |
|---|---|---|---|
| 1,649,399 | 11/27 | Gard | 73—422 |
| 2,637,211 | 5/53 | Norman | 73—422 |
| 2,306,606 | 12/42 | Hirsch | 73—422 X |
| 2,955,252 | 10/60 | Williams | 324—0.5 |

OTHER REFERENCES

Dunda et al.: Oil and Gas Journal, vol. 54, No. 55, May 21, 1956, pages 251–253.

RICHARD C. QUEISSER, *Primary Examiner*.

JOSEPH P. STRIZAK, *Examiner*.